United States Patent [19]

Deambrosio

[11] Patent Number: 4,802,617

[45] Date of Patent: Feb. 7, 1989

[54] RESTRICTION OF DROSS FORMATION IN A SOLDERING APPARATUS

[75] Inventor: Carlos A. Deambrosio, LaPrairie, Canada

[73] Assignee: Electrovert Limited, Toronto, Canada

[21] Appl. No.: 158,308

[22] Filed: Feb. 19, 1988

[51] Int. Cl.⁴ ............................................. B23K 3/06
[52] U.S. Cl. .................................. 228/180.1; 228/37; 228/34
[58] Field of Search .................. 228/34, 35, 37, 179, 228/180.1, 180.2

[56] References Cited

U.S. PATENT DOCUMENTS

| | | | |
|---|---|---|---|
| 3,921,888 | 11/1975 | Elliott et al. | 228/37 |
| 4,171,761 | 10/1979 | Boldt et al. | 228/180.1 |
| 4,666,077 | 5/1987 | Rahn et al. | 228/37 |
| 4,679,720 | 7/1987 | Sedrick et al. | 228/37 |
| 4,684,056 | 8/1987 | Deambrosio | 228/180.1 |

Primary Examiner—M. Jordan
Attorney, Agent, or Firm—Darby & Darby

[57] ABSTRACT

An improved method and apparatus restricts or limits dross formation in a soldering apparatus where liquid solder overflows such as wave soldering and the like. The improvement comprises a solder receiving tray positioned beneath at least a portion of liquid solder falling from an overflow or solder wave to a reservoir and a level control means limits the maximum solder level in the tray above a dynamic solder level in the reservoir, the solder level in the tray being a predetermined distance below the overflow to limit dross formation thus restricting dross recirculation.

19 Claims, 6 Drawing Sheets

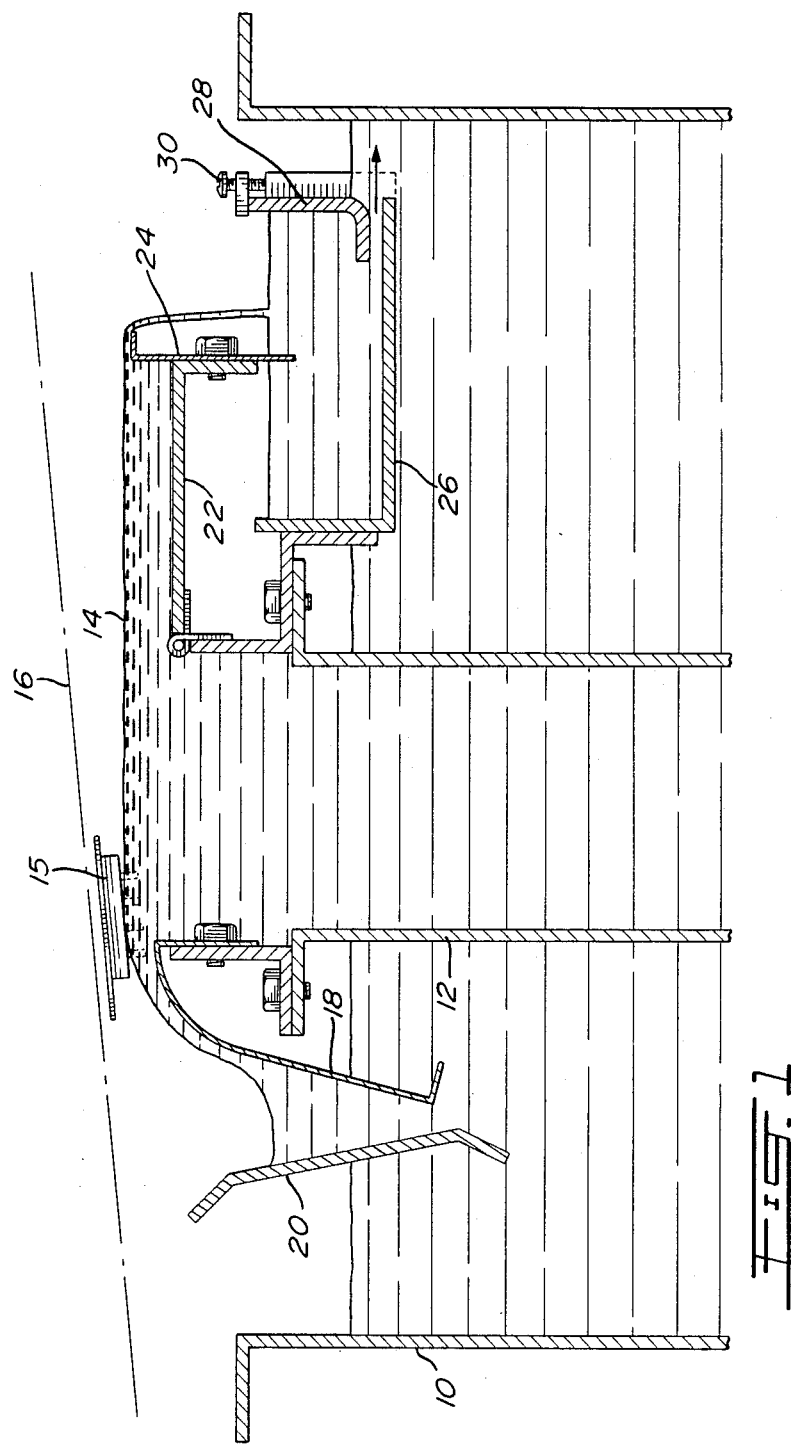

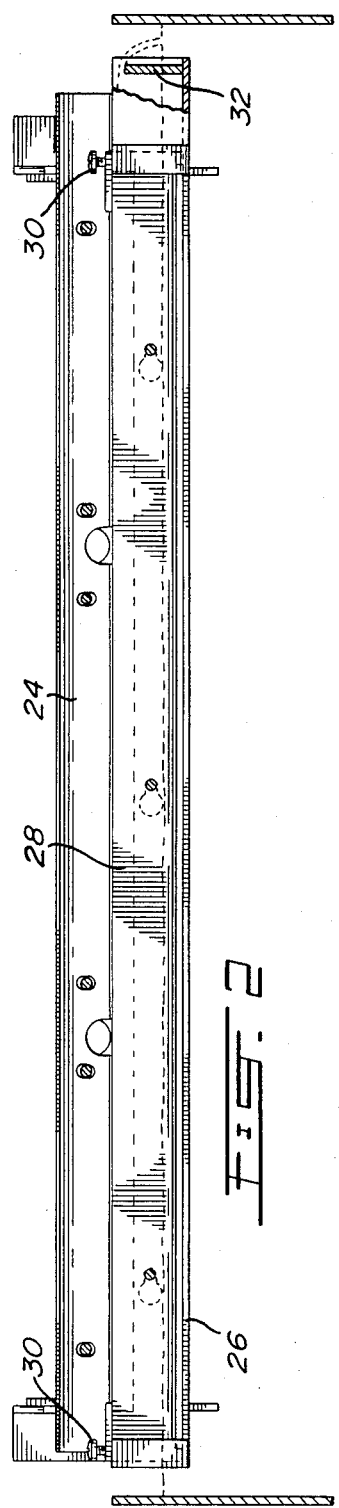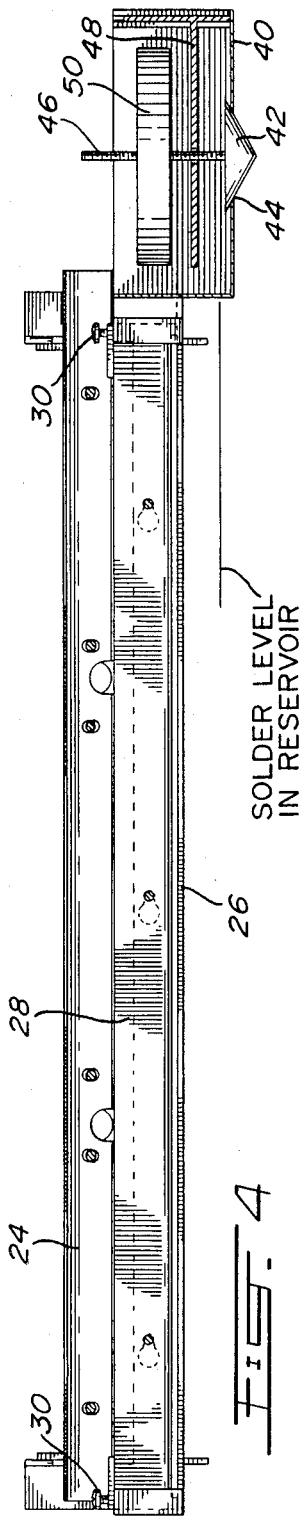

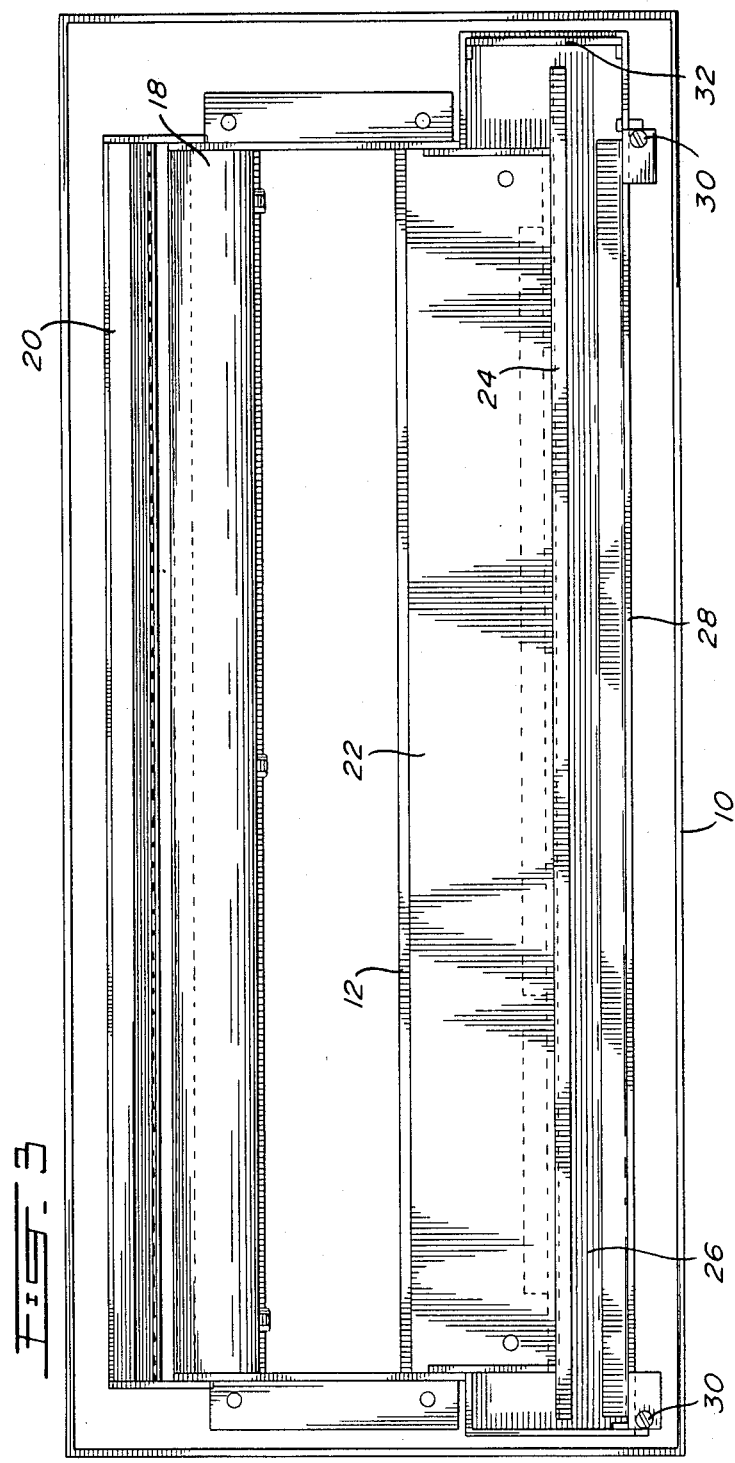

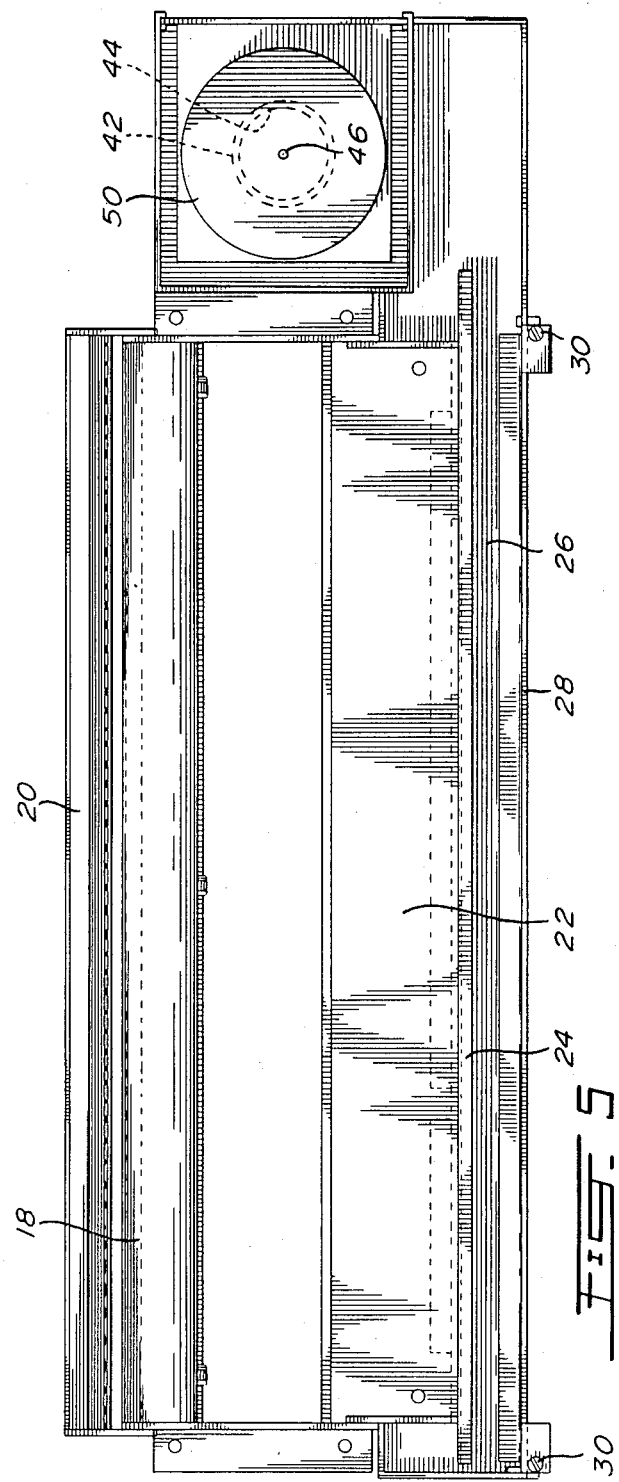

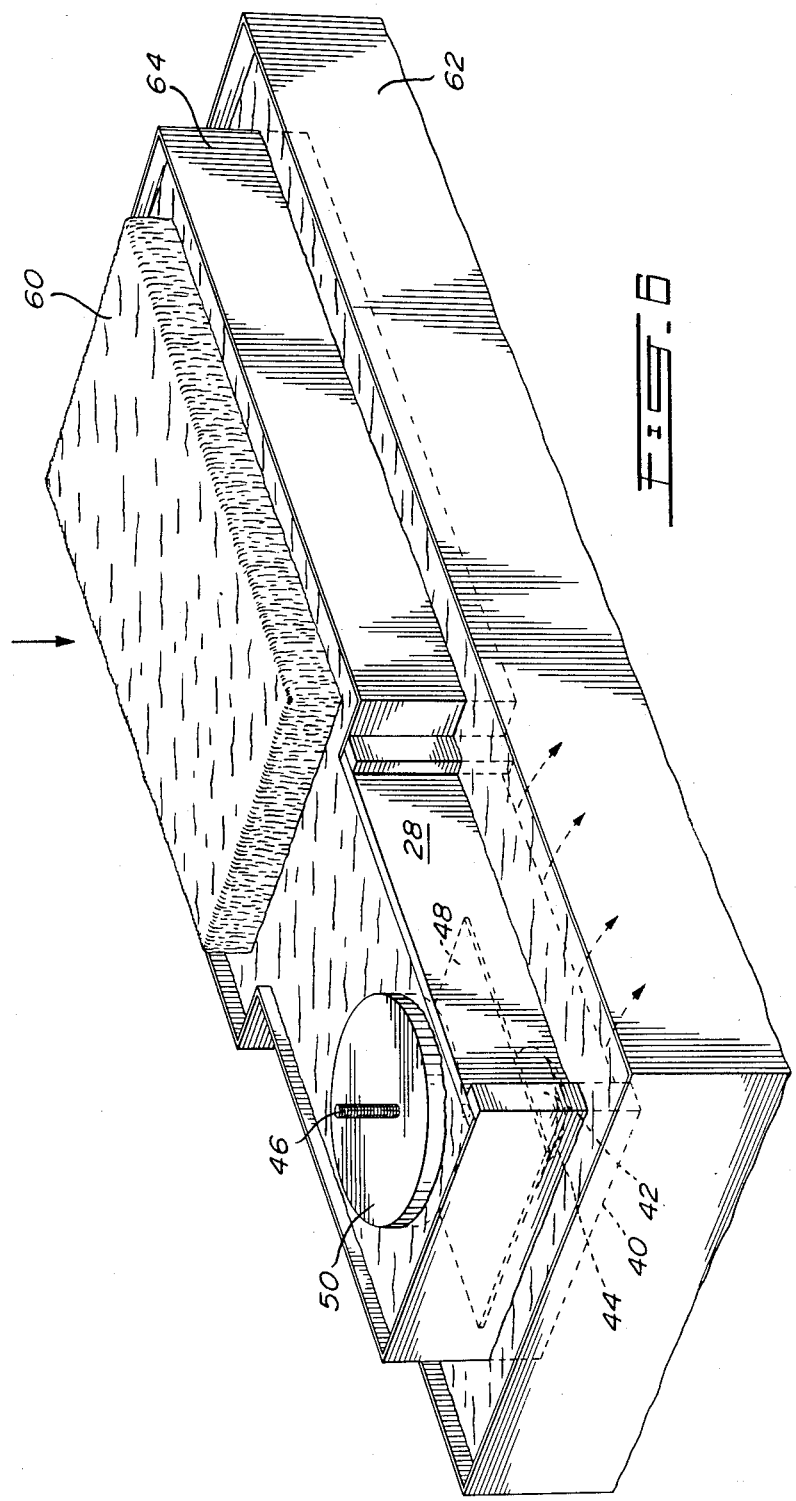

RESTRICTION OF DROSS FORMATION IN A SOLDERING APPARATUS

The present invention relates to soldering of printed wiring boards and the like, as well as other components such as radiators. More specifically, the present invention relates to an improved method and apparatus for restricting or limiting dross formation in a soldering apparatus where liquid solder overflows such as wave soldering and the like.

Tin oxide, or dross as it is referred to, forms on the surface of molten liquid solder in contact with air. Thus in wave soldering dross is always formed, self skims from the wave to collect on the surface of the solder pot and must be skimmed or in some other way removed from the surface at intervals to avoid recirculation of dross. When dross recirculates through the solder pump, it appears as undesirable matter in the wave. Various attempts have been made to restrict the formation of dross, in one method oil is poured over the surface of the liquid solder to prevent air contacting the solder. Oil, however, tends to be messy and degrades the solder, thus becoming a high maintenance item.

In the case of many methods of soldering such as wave soldering and dipping items to be soldered into a large solder wave where liquid solder overflows around the edges of a large nozzle opening, dross is formed. Whereas solder is referred to throughout the specification, the improvement of the present invention applies to other dross or oxide forming molten metals.

It is an aim of he present invention to reduce dross formation in any type of flow soldering method and apparatus by reducing turbulence of the liquid solder as it falls or flows down to the surface of a solder reservoir. By reducing dross formation, there are economies from less dross and the time intervals between skimming dross off the surface of liquid solder can be increased, and/or a smaller solder reservoir may be provided.

The present invention provides a solder receiving tray positioned below a solder overflow and above the surface of liquid solder in a reservoir. The solder drop from the overflow to the dynamic solder level of solder in the reservoir is generally at a height which tends to produce at least some splashing or turbulence resulting in dross formation. In one embodiment at least a minimum drop of about 1¼ inches is needed for the surface of the wave to be self skimming. The term "dynamic solder level" refers to the level of solder in the solder reservoir when the pump is operating and the solder is flowing.

The present invention provides in a soldering apparatus wherein liquid solder is pumped upwards from a solder reservoir and falls from an overflow back into the reservoir, the improvement comprising: a solder receiving tray positioned beneath at least a portion of the overflow to receive liquid solder from the overflow and a level control means to limit the maximum solder level in the tray above a dynamic solder level in the reservoir, the solder level in the tray being a predetermined distance below the overflow to limit dross formation thus restricting dross recirculation.

In one embodiment the level control means extends below all of the overflow in the form of a moat. In another embodiment, the liquid solder falls from the overflow in free fall. In yet another embodiment, a solder wave is formed by pumping liquid solder through a nozzle, and the solder receiving tray is provided on at least on side of the nozzle.

In a still further embodiment, there is provided in a soldering apparatus wherein a solder wave is formed by pumping liquid solder upwards from a solder reservoir through a nozzle above the reservoir, components to be soldered are conveyed from an entry side of the solder wave through to an exit side of the solder wave, the exit side of the solder wave flowing in a trough and over a weir at the end of the trough downstream of the nozzle, the improvement comprising: a solder receiving tray positioned below the trough to receive liquid solder flowing over the weir, and a level control means to limit the maximum solder level in the tray above a dynamic solder level in the reservoir, the solder level in the tray being a predetermined distance below the liquid solder flowing over the weir to provide optimum solder flow from the solder wave and limit dross formation thus restricting dross recirculation.

In yet a further embodiment there is provided in a method of soldering wherein liquid solder is pumped upwards from a solder reservoir and falls from an overflow back into the reservoir, the improvement comprising the steps of catching at least a portion of the liquid solder falling from the overflow in a tray, and maintaining a level of solder in the tray at a predetermined distance below the overflow and above a dynamic solder level in the reservoir to limit dross formation thus restricting dross recirculation, and draining the liquid solder from the tray into the reservoir with minimum turbulence.

BRIEF DESCRIPTION OF THE DRAWINGS

In drawings which illustrate embodiments of the invention:

FIG. 1 is a sectional end view through a wave soldering apparatus illustrating one embodiment of a solder receiving tray to restrict or limit formation of dross;

FIG. 2 is a side view partially in section of the soldering apparatus shown in FIG. 1 illustrating a weir to control the level of solder in the solder receiving tray;

FIG. 3 is a top plan view of the nozzle and solder receiving tray shown in FIG. 1;

FIG. 4 is a side view partially in section showing a valve and float to control the level of solder in the solder receiving tray;

FIG. 5 is a top plan view of the soldering apparatus shown in FIG. 4;

FIG. 6 is an isometric view of an overflow solder dipping apparatus with a solder receiving tray according to the present invention.

DESCRIPTION OF THE PREFERRED EMBODIMENTS

Referring now to the drawings, FIGS. 1, 2 and 3 show a solder reservoir 10 with a solder nozzle 12 through which molten liquid solder is pumped to a solder wave 14. Printed wiring boards 15 are conveyed in a conveyor path 16 so that pins and other areas to be soldered pass through the crest of the solder wave 14. An entry or upstream side of the solder wave is shown to have a contoured front plate 18 down which the solder flows in a non-turbulent fashion into the solder pot 10. A baffle 20 acts as a guide and is hinged to restrict solder flow at the bottom, thus can be set to provide a raised level above the dynamic solder level in the reservoir. The majority of solder flow from the wave flows to the entry side of the solder wave 14.

On the exit side of the solder wave is a back plate 22 which is hinged to the edge of the nozzle 12 and supports at the exit end a weir 24 to form a trough. Liquid solder falls over the weir 24. In one embodiment, the solder from the solder wave flows in the trough and over the weir 24 at approximately the same speed as the conveyor 16 so that as the printed wiring board passes through and leaves the solder wave 14, there are no side icicles formed on pins and other soldered parts.

Beneath the weir 24 is a solder receiving tray 26 which has an adjustable plate 28 at the downstream side to form a gate allowing some solder to flow from the tray 26 beneath the plate 28 to the reservoir 10. In most solder waves there is generally a drop of approximately two and a half to three inches from the crest of the solder wave to the dynamic solder level in the reservoir 10. By use of the solder receiving tray 26 the solder level in the tray 26 is kept at a predetermined distance below the weir 24 and in a preferred embodiment the distance from the lip of the weir 24 to the solder level in the tray 26 is in the range of an inch and a quarter to an inch and a half although this may be as much as an inch and three quarters.

The adjustable plate 28 is adjustable by screws 30 to control the flow of solder through the gate into the solder reservoir 10. Furthermore, as shown in FIG. 2 a level control weir 32 is positioned at at one end of the tray 26 so that it is away from the solder wave and also away from the conveyor 16 conveying articles through the solder wave 14. The level control weir 32 is a safety overflow device that controls the desired solder level in the tray 26. This level is selected so that optimum solder flow from the solder wave 14 over the weir 24 is achieved for soldering components conveyed along the conveyor path, and the formation of dross is limited as much as possible consistent with optimum solder flow. Thus two weirs are provided, weir 24 on the exit side of the solder wave and the level control weir 32 at one end of the tray 26 so that the solder falls in two stages rather than a single stage. Furthermore, by permitting a portion of the solder flow to exit below the adjustable plate 28, less turbulence occurs and a reduction in dross is attained.

It is found that dross can form in the liquid solder exiting through the gate below the adjustable plate 28. If this occurs, then more solder flows over the level control weir 32 at the end of the tray 26, but there is substantially no change in the solder level in the tray. The maximum level of the solder in the tray 26 is adjustable by varying the height of the level control weir 32.

In the embodiment shown, the bottom of the tray 26 is below the dynamic solder level in the reservoir, thus no free fall of solder occurs when solder flows through the gate. Whereas the bottom of the tray is illustrated as being flat, it may be sloped down to the gate to reduce the volume of solder retained in the tray. In other embodiments, a tray may be provided which has a bottom that is above the dynamic solder level in the reservoir 10. In this case there is preferably a lower portion which has a gate with an exit below the dynamic solder level.

FIGS. 4 and 5 illustrate another embodiment for controlling the level of solder in the solder receiving tray. As can be seen at one end of the tray 26 is a lower portion 40 extending down below the dynamic solder level in the reservoir 10. A valve 42 is positioned over a valve opening 44 in the lower portion 40. A valve stem 46 attached to the valve 42 extends up through a baffle plate 48 to a float 50. In a preferred embodiment the float is attached to a threaded stem 46 so that by rotation of the float 50 relative to the stem 42 adjustment can be made to the solder level in the solder receiving tray 26. The baffle plate 48, as can be seen in FIG. 5, extends over the area of the valve 42 and acts to prevent a vortex occurring in the solder when it exits through the valve opening 44. Because the opening 44 is below the dynamic solder level in the reservoir 10, no turbulence occurs when the solder exits into the reservoir. The buoyancy of the float 50 is selected to give a predetermined range of solder level in the tray 26 from valve opened to valve closed. The advantage of the valve system shown in FIGS. 4 and 5 is that no level control weir 32 is provided so no solder falls by free fall 32 into the reservoir 10. Instead of falling over a weir the solder flows through the valve opening 44 which is below the dynamic solder level in the reservoir thus minimum turbulence occurs. The solder level in the tray 26 remains substantially constant, preferably about $1\frac{1}{4}$ to $1\frac{1}{2}$ inches below the solder wave 14, regardless of how much solder flows through the gate under the adjustable plate 28.

FIG. 4 shows the dynamic solder level below the bottom of the tray 26 so solder flowing under the plate 28 through the gate falls into the reservoir. In a preferred embodiment, at least a portion of the bottom of the tray with the gate therein is lowered below the dynamic solder level so the solder does not fall but flows through the gate.

Tests conducted with the apparatus shown in FIGS. 3 and 4 allowed the skimming of dross of the surface of the reservoir 10 to be carried out at the end of an eight hour shift instead of every two hours or less which was common on similar devices not having the solder receiving tray 26.

A solder dipping device is illustrated in FIG. 6 which has a rectangular dipping tank 60 for dipping such items as tin cans, radiators and other items requiring tinning or solder coating. A pump (not shown) pumps liquid metal, such as solder or tin, from a reservoir 62 below the dipping tank 60 so that the solder flows over the top edges of the tank 60 and falls in a free fall into a receiving tray 64 which surrounds the tank 60 forming a moat. Whereas a free fall of solder is illustrated, a contoured flow plate for streamline flow may also be used.

At one side of the tray is a lower portion 40 with a valve 42 similar to that shown in FIGS. 4 and 5. The level of the lower portion 40 is below the dynamic solder level in the reservoir 62 so no free fall of solder occurs from the tray 64 to the reservoir 62.

Furthermore, an adjustable plate 28 is shown which may be raised up similar to that shown in FIG. 1 to provide a gate for solder to flow into the reservoir. The gate may not always be required if the valve opening 44 is sufficiently large to take all the solder flow over the top edges of the tank 60.

Whereas FIGS. 1 to 5 show a specific design of solder wave device, it will be apparent to those skilled in the art that other types of solder wave including units which have two solder waves in a row, may be utilized with a solder receiving tray. The solder receiving tray of the present embodiment is shown extending along only the downstream portion of the solder wave. It would be apparent to those skilled in the art that this tray could also extend for the upstream portion as well as the downstream portion and in another embodiment may extend all around the solder wave in the form of a moat so that there was an intermediate solder receiving tray to catch all of the solder from the solder wave to prevent there being a large fall of solder, thus minimizing the dross formation.

Various changes may be made to the apparatus to restrict formation of solder dross without departing from the scope of the present invention which is limited only by the following claims.

The embodiments of the invention in which an exclusive property or privilege is claimed are defined as follows:

1. In a soldering apparatus wherein liquid solder is pumped upwards from a solder reservoir and falls from an overflow back into the reservoir, the improvement comprising a solder receiving tray positioned beneath at least a portion of the overflow to receive liquid solder falling from the overflow, and a level control means to limit the maximum solder level in the tray above a dynamic solder level in the reservoir, the solder level in the tray being a predetermined distance below the overflow to limit dross formation thus restricting dross recirculation.

2. The soldering apparatus according to claim 1 wherein the solder receiving tray extends beneath all of the overflow in the form of a moat.

3. The soldering apparatus according to claim 1 wherein a solder wave is formed, by pumping liquid solder upwards through a nozzle, and the solder receiving tray is provided on at least one side of the nozzle.

4. The soldering apparatus according to claim 1 wherein the predetermined distance of the solder level in the tray below the overflow is in the range of about 1¼ to 1¾ inches.

5. In a soldering apparatus wherein a solder wave is formed by pumping liquid solder upwards from a solder reservoir through a nozzle above the reservoir, and components to be soldered are conveyed by a conveyor from an entry side of the solder wave through to an exit side, the improvement comprising:
    a solder receiving tray positioned below the top of the nozzle to receive liquid solder from at least the exit side of the solder wave, and
    a level control means located outside the area of the solder wave and the conveyor, to limit the maximum solder level in the tray above a dynamic solder level in the reservoir, the solder level in the tray being a predetermined distance below the solder wave to provide optimum liquid solder flow from the solder wave and limit dross formation thus restricting dross recirculation.

6. The soldering apparatus according to claim 5 wherein the level control means controls the solder level in the tray within a predetermined range.

7. The soldering apparatus according to claim 5 wherein the level control means is a weir adjustable for height.

8. The soldering apparatus according to claim 6 wherein the level control means comprises a valve operated by a float.

9. The soldering apparatus according to claim 8, wherein the float is located at least partially by a baffle plate over a valve opening in a low portion of the tray to prevent a vortex occurring when the liquid solder flows through the valve opening.

10. The soldering apparatus according to claim 8 wherein the low portion of the tray is below the dynamic solder level in the reservoir.

11. In a soldering apparatus wherein a solder wave is formed by pumping liquid solder upwards from a solder reservoir through a nozzle above the reservoir, components to be soldered are conveyed from an entry side of the solder wave through to an exit side of the solder wave, the exit side of the solder wave flowing in a trough and over a weir at the end of the trough downstream of the nozzle, the improvement comprising:
    a solder receiving tray positioned below the trough to receive liquid solder flowing over the weir and,
    a level control means to limit the maximum solder level in the tray above a dynamic solder level in the reservoir, the solder level in the tray being a predetermined distance below the liquid solder flowing over the weir to provide optimum solder flow from the solder wave and limit dross formation thus restricting dross recirculation.

12. The soldering apparatus according to claim 11 including a first drain to drain at least a portion of the liquid solder from the solder receiving tray to the reservoir separately from the level control means.

13. The soldering apparatus according to claim 12 herein the level control means comprises a valve operated by a float located outside the area of the solder wave and the conveyor.

14. The soldering apparatus according to claim 13 wherein the float is located at least partially by a baffle plate over a valve opening in a low portion of the tray to prevent a vortex occurring when the liquid solder flows through the valve opening.

15. The soldering device according to claim 14 wherein the valve opening is below the dynamic solder level in the reservoir.

16. The soldering apparatus according to claim 11 wherein the predetermined distance is controlled within the range of about one and a quarter to one and a half inches.

17. In a method of soldering wherein liquid solder is pumped upwards from a solder reservoir and falls from an overflow back into the reservoir, the improvement comprising the steps of:
    catching at least a portion of the liquid solder falling from the overflow in a tray,
    maintaining a level of solder in the tray at a predetermined distance below the overflow and above a dynamic solder level in the reservoir to limit dross formation thus restricting dross recirculation, and
    draining the liquid solder from the tray into the reservoir with minimum turbulence.

18. In a method of soldering components conveyed through a solder wave produced by pumping liquid solder upwards from a reservoir to a nozzle above the reservoir and allowing the solder to fall back into the reservoir, the improvement comprising the steps of:
    catching at least a portion of the liquid solder from the solder wave in a tray such that the level of solder in the tray is at a predetermined distance below the solder wave and above a dynamic solder level in the reservoir, to provide optimum solder flow from the solder wave and limit dross formation thus restricting dross recirculation,
    controlling the level of solder in the tray at the predetermined distance, and
    draining the liquid solder from the tray into the reservoir with minimum turbulence.

19. The method according to claim 18 wherein the predetermined distance between the level of solder in the tray and the solder wave is controlled by a float connecting to a valve in an opening located below the dynamic solder level in the reservoir.

* * * * *